April 28, 1959  HENRI-GEORGES DOLL  2,884,195
ELECTRO-OPTICAL FUNCTION GENERATOR
Filed Sept. 20, 1956  2 Sheets-Sheet 1

INVENTOR.
HENRI-GEORGES DOLL
BY Robert Hockfield
HIS ATTORNEY

April 28, 1959 HENRI-GEORGES DOLL 2,884,195
ELECTRO-OPTICAL FUNCTION GENERATOR
Filed Sept. 20, 1956 2 Sheets-Sheet 2

INVENTOR.
HENRI-GEORGES DOLL
BY Robert Hockfield
HIS ATTORNEY

2,884,195

ELECTRO-OPTICAL FUNCTION GENERATOR

Henri-Georges Doll, Ridgefield, Conn., assignor, by mesne assignments, to Schlumberger Well Surveying Corporation, Houston, Tex., a corporation of Texas Application September 20, 1956, Serial No. 610,945

9 Claims. (Cl. 235—197)

This invention relates to computing apparatus and, more particularly, pertains to a new and improved electro-optical function synthesizer of the type described in Patent No. 2,497,042 to H. G. Doll.

As disclosed in that patent, a beam of light is positioned relative to a screen by a pair of mirror-galvanometers in accordance with the instantaneous values of two independent variables $x$ and $y$. The screen has an opacity which is graded essentially continuously in a manner to define $z=f(x,y)$ and thus by measuring the light intensity after it is modified by the screen, indications of the dependent variable $z$ are obtained. This apparatus is generally satisfactory, but the screen may sometimes be difficult to construct and may not be as versatile as desired.

It is, therefore, an object of the present invention to provide new and improved apparatus of the foregoing type facilitating construction of the function-defining screen.

Another object of the present invention is to provide new and improved computing apparatus having a function-defining screen which may be readily altered in order to change functions.

Yet another object of the present invention is to provide a new and improved electro-optical function synthesizer which is relatively simple and inexpensive to construct and yet is entirely accurate and reliable in operation.

Computing apparatus embodying the present invention comprises a principal screen that includes a plurality of zones having individual effects on incident radiant energy and collectively defining a selected function of an independent variable for discrete values thereof, an interpolation screen having a prescribed gradation in an effect on incident radiant energy and means for projecting radiant energy toward the screens to impinge thereon in succession. Means are provided for effectively positioning the screens relative to one another in accordance with an independently variable quantity and the apparatus further comprises means responsive to radiant energy modified by the screens for deriving indications representing a value of the function corresponding to a particular value of the independently variable quantity.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
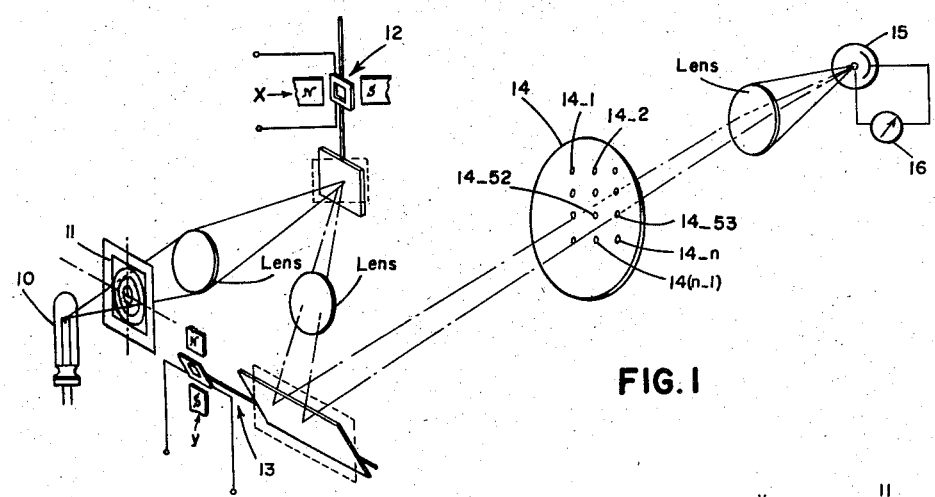
Fig. 1 is a schematic representation, in perspective view, of computing apparatus embodying the present invention.

In the computing apparatus embodying the present invention shown in Fig. 1 of the drawings, radiant energy in the form of light from a source 10 passes through an interpolation screen 11, to be described in detail hereafter. A suitable lens system is provided so that after light is reflected by the mirrors of $x$ and $y$ galvanometers 12 and 13, an image of interpolation screen 11 is formed on a principal opaque screen 14 having disc-like zones 14—1, 14—2 . . . 14—($n$-1) and 14—$n$. These zones have individual opacities to incident light energy collectively to define the function $z=f(x,y)$ for discrete values of independent variables $x$ and $y$. Thereafter, light is intercepted by a photocell 15 which is connected to an indicator 16.

Figure 2:
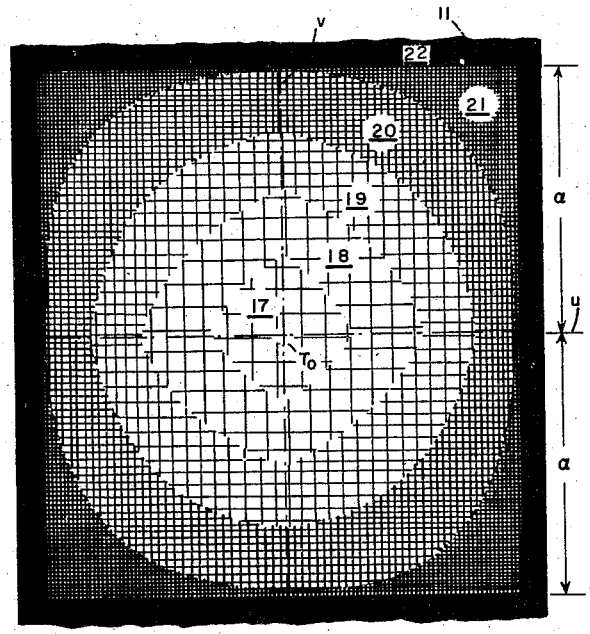
Fig. 2 is a plan view of a portion of the apparatus shown in Fig. 1 drawn to an enlarged scale.

In order to effect a linear interpolation, screen 11 should have a transparency, T, which varies continuously according to the following relationship:

$$T = T_0\left(1 - \frac{u}{a}\right)\left(1 - \frac{v}{a}\right) \quad (1)$$

where "$T_0$" is the transparency at the center of the screen, "$u$" and "$v$" are coordinate values and "$a$" is a constant equal to one-half the length of one side of the screen. For example, as an approximation of the foregoing relationship, the screen may be constructed as shown in Fig. 2 in which a coordinate system is represented by perpendicular lines $u$ and $v$. At the junction, $T_0$, of co-ordinates $u$ and $v$, the transparency of screen 11 is a maximum, while in each of the quadrants the transparency decreases successively along a plurality of adjacent zones 17 through 21. In each quadrant the zones 17–21 should be in the form of arcuate bands defined by a family of hyperbolas framed by an opaque zone 22 of square configuration. If "$a$" as defined above is the perpendicular distance from central point, $T_0$, to a side of zone 22, then "$a$" should be such that in the image of the interpolation screen 11 on the perforated screen 14, the distance betwen the center, $T_0$, and a side will coincide with the distance between centers of "disc-like" zones 14—1 through 14—$n$. By transposing the axis of the family of hyperbolas to a corner of the square zone 22, and if the new axes are designated U and V, from Equation 1 it may be shown that:

$$T = T_0 UV \quad (2)$$

where $U=a-u$ and $V=a-v$. These hyperbolas are distributed along a common axis extending from central point, $T_0$, toward a corner of zone 22 and all are asymptotic to extensions of the lines forming this corner.

Of course, any number of zones greater than the ones designated 17 through 21 may be employed in the interpolation screen to achieve a desired accuracy.

In operation, galvanometers 12 and 13 position the image of interpolation screen 11 relative to principal screen 14 according to instantaneous values of $x$ and $y$ and the amount of light falling on photocell 15 depicts the instantaneous value of $z$. Accordingly, meter 16 provides an indication of $z$.

Figure 3:
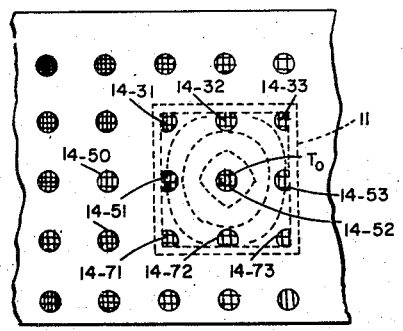
Figs. 3 and 4 are similar plan views of another portion of the apparatus illustrated in Fig. 1, drawn to an enlarged scale, and representing different operating conditions particularly useful in explaining the mode of operation of the apparatus.

If, for example, the image is positioned with $T_0$ coinciding with one of the zones, say 14—52, as shown in Fig. 3, the opacity of this zone alone determines the value of $z$. Since adjacent zones 14—31, 14—32, 14—33, 14—51, 14—53, 14—71, 14—72 and 14—73 are intercepted by the image of opaque portion 22 of the interpolation screen, there is no contribution by these zones to the light falling on the photocell.

Figure 4:
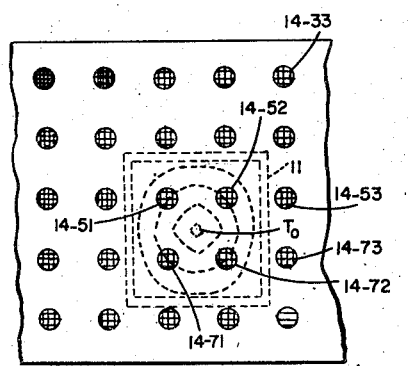

If, however, the position of the image of screen 11 is such that $T_0$ does not coincide with one of the zones of the principal screen, an interpolation is effected. Suppose, for example, the image is located as shown in Fig. 4 with $T_0$ at some point between the zones 14—51, 14—52, 14—71 and 14—72. In this case, all of these zones contribute to the light falling on photocell 15, in accordance with their transparencies, but the amount of light reaching each zone is dependent upon the relative position of the image of interpolation screen 11. Since the transparency of the interpolation screen 11 is arranged in hyperbolic zones, as described above, the total light falling on photocell 15 represents the interpolated value of $z$ and this is indicated at meter 16.

Figure 5:
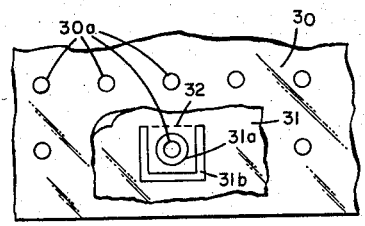
Figs. 5, 6 and 7 represent respective modifications which may be made to a portion of the apparatus illustrated in Fig. 1.
Figure 6:
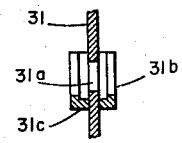

To facilitate calibration, the principal screen may be arranged in the manner shown in Fig. 5. An opaque screen 30 is provided with identical apertures 30a at the locations of zones 14—1 through 14—n. Screen 30 serves as a mask for another screen 31 positioned behind it. Screen 31 has a plurality of identical apertures 31a aligned with the apertures 30a, but of larger size. As best seen in Fig. 6, a U-shaped support 31b is fixed to the backside of screen 31 adjacent each aperture and a U-shaped support 31c is similarly positioned adjacent each aperture on the front side of this screen. Each of these supports includes a suitable slot so that individual slides, such as the one designated 32, of preselected transparency may be inserted into each of the supports 31b to form a desired function. The supports 31c receive individual slides for correction purposes. If desired, screen 31 may be removable so that once a given function is set up it may be retained for future use. Of course, merely by removing the slides from supports 31b and inserting a new set, another function may be provided.

In order to calibrate or standardize the computer, all slides are moved and adjustable voltages are supplied to galvanometers 12 and 13 so that the center of the image of interpolation screen 11 may be made to coincide with each of the apertures 30a corresponding to the zones 14—1 through 14—n. At any of these positions, the amount of light falling on photocell 15 should be the same. If for any reason this does not occur, the zone through which the minimum amount of light passes (lowest reading on meter 16) is taken as a standard, and correction slides of proper transparency are inserted into the supports 31c to provide the same reading on meter 16 for all other apertures. After this type of equalization, function slides may be inserted into supports 31b.

Since the computer just described is responsive to the amount of light passed by the principal screen, this screen may be formed by reaming a plurality of holes of preselected size in an opaque sheet. The size and disposition of these holes, of course, is arranged in accordance with the values of the function to be employed.

It is evident from the foregoing discussion that in a computer featuring the present invention, interpolated values of the dependent variable are quickly and accurately obtained. In addition, since the principal screen need only describe the function for discrete values of the independent variables, its construction is relatively simple and inexpensive. Moreover, by the use of an arrangement of slides as illustrated in Figs. 5 and 6, the versatility of the instrument is markedly increased.

Although in the embodiment of the invention described hereinbefore, an image of the interpolation screen is formed on the principal screen and is positioned with respect thereto in two coordinated directions according to instantaneous values of the independent variables, other organizations of elements are within the contemplation of the invention. For example, the interpolation screen may be disposed closely adjacent to the principal screen and provided with a section 22 sufficiently enlarged to mask the principal screen. Thus, a general illumination instead of mirror-galvanometers may be used, the interpolation screen or the principal screen can be physically displaced by appropriate servomechanism in the coordinate directions according to the independently variable quantities, and the resultant light intensity intercepted by photocell 15. Therefore, whether the image of the interpolation screen or of the principal screen is displaced relative to the remaining screen, whether physical displacement of one or both of the screens is effected, or whether any combination of these is used, all are within the meaning of terminology specifying that the screens are effectively positioned relative to one another in accordance with an independently variable quantity.

Figure 7:
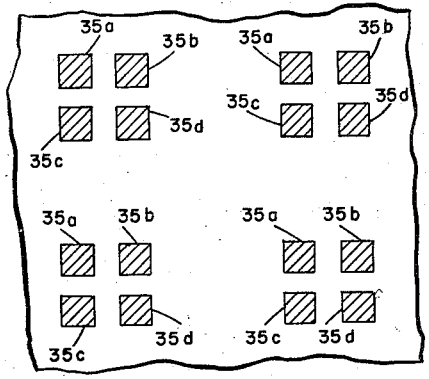

In an arrangement such as shown in Fig. 5, including a perforated plate 30, a screen 35 such as illustrated in Fig. 7 may be employed. This screen may be in the form of a photographic plate including one set of regularly spaced zones 35a whose transparencies define a particular function. The plate may include one or more additional sets, such as regularly spaced zones 35b, zones 35c and zones 35d, which define other functions. A mechanical system may be provided so that simply by manipulating a control knob, screen 35 may be shifted relative to mask 30 to bring any of the sets of zones into position behind apertures 30a. If desired, each of the functions may be inscribed at spaced locations along the path of a pointer associated with the control knob and a detent may be provided for releasably locking the mechanical system at each function.

Figure 8:
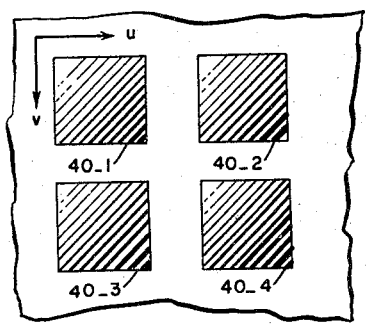
Figs. 8 and 9 illustrate yet another modification applicable to Fig. 1.

As shown in Fig. 8, the screen positioned behind mask 30 may include a plurality of zones 40—1, 40—2 ... 40—n, each associated with one of the apertures 30a. Each zone is of continuously varying transparency and the zones collectively define $z=f(x, y)$ for ranges of values of variables $u$ and $v$. Thus, by positioning screen 40 in directions $u$ and $v$ in accordance with these variables, the computer may be employed for computations of a function having the form $z=f(x, y, u, v)$. This positioning may be accomplished by suitable servomechanism. The range of movement of screen 40, of course should be limited in the $u$ and $v$ directions to the distance between apertures 30a.

Figure 9:
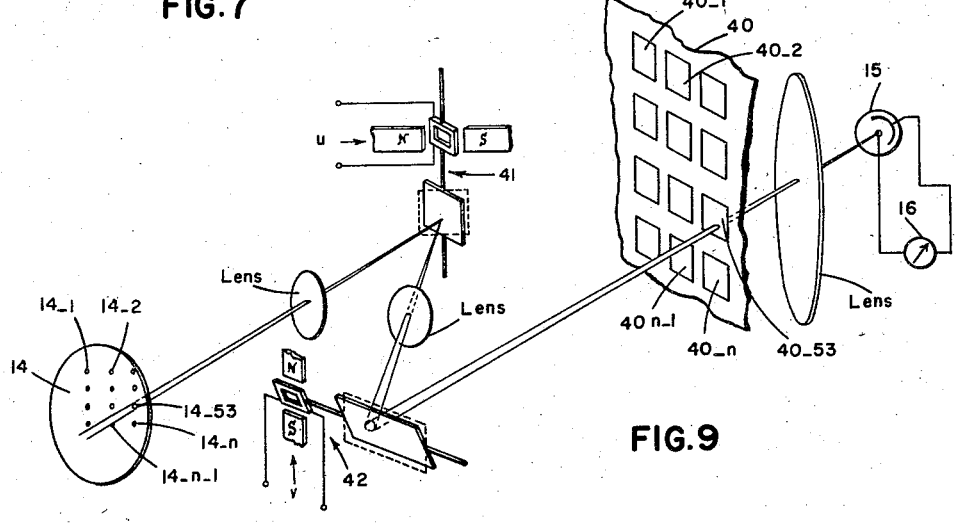

In order to increase the speed of response to variables $u$ and $v$, mechanical positioning of screen 40 may be avoided by modifying the apparatus illustrated in Fig. 1 in the manner shown in Fig. 9 to include optical positioning of an image of the screen 14. For this purpose, the image of screen 14 is formed on the screen 40 by an optical system comprised of appropriate lenses and mirror-galvanometers 41 and 42. These galvanometers are arranged to displace the resulting light beam in relatively perpendicular directions according to independent variables $u$ and $v$. From screen 40, light is concentrated by a suitable lens on photocell 15.

Although the interpolation screen, screen 14 and screen 40 have been described as in a particular space order relationship, they are conjugate and therefore other orders may be employed.

It should be noted that although the invention has been described in connection with computations of a function of two variables, it obviously has application to a function of one variable. Accordingly, the principal screen may comprise a single line of function-defining zones employed with an interpolation screen in the form of a narrow strip of the screen illustrated in Fig. 2.

From an analysis of the single variable case, which is equally applicable to the two variable arrangements, it may be shown that while an interpolation screen of continuously and linearly varying opacity or transparency can be used, a step-function may be employed. Thus, if the screen has a completely transparent zone having a width equal to the width of zones in the principal screen, the width of the latter zones effectively performs a linear interpolation to give the exact value of the function. Hence, as used herein the term "gradation" is intended to denote both continuous and stepped variations in opacity of the interpolation screen.

Of course, by appropriately arranging the gradation in the interpolation screen, interpolations other than linear may be achieved.

Any known techniques may be employed to provide screen elements of the required opacity or transparency for the interpolation and principal screens. Conventional photographic processes can be used or neutral density filter glass may be ground to a thickness providing a desired transparency. Alternatively, each zone of the principal screen may be comprised of a pair of light polarized discs, one of which is rotatable. Accordingly, the rotatable disc at each zone can be rotated to provide a required transparency.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Computing apparatus comprising: a principal screen including a plurality of zones having individual effects on incident radiant energy and collectively defining a selected function of an independent variable for discrete values thereof; an interpolation screen having a prescribed gradation in an effect on incident radiant energy related to interpolated values of said function between an adjacent pair of said zones; means for projecting radiant energy toward said screens so as to be influenced thereby in succession; means for effectively positioning said screens relative to one another in accordance with an independently variable quantity; and means responsive to radiant energy modified by said screens for deriving indications representing a value of said function corresponding to a particular value of said variable quantity.

2. Computing apparatus comprising: a principal screen including a plurality of zones spaced apart a substantially fixed distance having individual effects on incident radiant energy and collectively defining a selected function of an independent variable for discrete values thereof; an interpolation screen having an effect on incident radiant energy continuously variable from a central section toward opposed sections individually spaced from said central section said fixed distance, variations in said effect being related to interpolated values of said function between an adjacent pair of said zones; means for projecting radiant energy toward said screens so as to be influenced thereby in succession; means for effectively positioning said screens relative to one another in accordance with an independently variable quantity; and means responsive to radiant energy modified by said screens for driving indications representing a value of said function corresponding to a particular value of said variable quantity.

3. Computing apparatus comprising: a principal screen including a plurality of zones having individual effects on incident radiant energy and arranged in a pattern collectively to define a selected function of two independent variables for discrete values of each of said variables; an interpolation screen having a prescribed gradation in an effect on incident radiant energy related to interpolated values of said function between an adjacent pair of said zones; means for projecting radiant energy toward said screens so as to be influenced thereby in succession; means for effectively positioning said screens relative to one another in each of two coordinate directions in accordance with a respective one of two independently variable quantities; and means responsive to radiant energy modified by said screens for deriving indications respresenting a value of said function corresponding to a particular pair of values of said variable quantities.

4. Computing apparatus comprising: a principal screen including a plurality of zones spaced apart a substantially fixed distance in each of two coordinate directions and having individual effects on incident radiant energy collectively to define a selected function of two independent variables for discrete values of each of said variables; an interpolation screen having an effect on incident radiant energy graded to exhibit a central section surrounded by successive graded sections, lines of constant effect being arcs of equilateral hyperbole, the gradation in said effect being thus related to interpolated values of said function between an adjacent pair of said zones; means for projecting radiant energy toward said screens so as to be influenced thereby in succession; means for effectively positioning said screens relative to one another in said coordinate directions in accordance with respective ones of two independently variable quantities; and means responsive to radiant energy modified by said screens for deriving indications representing a value of said function corresponding to a particular pair of values of said variable quantities.

5. Computing apparatus comprising: a principal screen including a plurality of zones having individual effects on incident radiant energy and collectively defining a selected function of an independent variable for discrete values thereof; an interpolation screen having a prescribed gradation in an effect on incident radiant energy related to interpolated values of said function between an adjacent pair of said zones; radiant energy means for forming superposed images of said screens whereby radiant energy is influenced thereby in succession; means for effectively positioning said images of said screens relative to one another in accordance with an independently variable quantity; and means responsive to radiant energy modified by said screens for deriving indications representing a value of said function corresponding to a particular value of said variable quantity.

6. Computing apparatus including: a principal screen comprised of an essentially opaque sheet-like member including a plurality of zones spaced apart a substantially fixed distance in each of two perpendicular coordinate directions and having individual values of transparency to incident radiant energy collectively to define a selected function of two independent variable for discrete values thereof; an interpolation screen having a prescribed gradation in transparency to incident radiant energy related to interpolated values of said function between an adjacent pair of said zones; means for projecting radiant energy through said interpolation screen to form an image thereof on said principal screen; means for positioning said image of said interpolation screen relative to said principal screen in said coordinate directions in accordance with respective ones of two independently variable quantities; and means responsive to radiant energy passing through said principal screen for deriving indications representing a value of said function corresponding to a particular pair of values of said variable quantities.

7. Computing apparatus comprising: a principal screen including a sheet-like member essentially opaque to incident radiant energy having a plurality of openings and a plurality of members removably connected to said sheet-like member in association with respective ones of said openings and having individual effects on incident radiant energy collectively to define a selected function of an independent variable for discrete values thereof; an interpolation screen having a prescribed gradation in an effect on incident radiant energy related to interpolated values of said function between an adjacent pair of said zones; means for projecting radiant energy toward said screens so as to be influenced thereby in succession; means for effectively positioning said screens relative to one another in accordance with an independently variable quantity; and means responsive to radiant energy modified by said screens for deriving indications representing a value of said function corresponding to a particular value of said variable quantity.

8. Computing apparatus comprising: an opaque mask having a plurality of zone essentially transparent to radiant energy; a principal screen including a first group of zones adapted to be aligned with said zones of said mask having individual effects on incident radiant energy and collectively defining a selected function of an independent variable for discrete values thereof, and a second group of zones adapted to be aligned with said zones of said mask, having individual effects on incident radiant energy and collectively defining another selected function of an independent variable for discrete values thereof; means for aligning a selected group of zones of said principal screens with said zones of said mask; an interpolation screen having a prescribed gradation in an effect on incident radiant energy related to interpolated values of said function between an adjacent pair of said zones; means for projecting radiant energy toward said screens so as to be influenced thereby in succession; means for effectively positioning said screens relative to one another in accordance with an independently variable quantity; and means responsive to radiant energy modified by said screens for deriving indications representing a value of said function corresponding to a particular value of said variable quantity.

9. Computing apparatus comprising: a principal screen including a plurality of zones having individual effects on incident radiant energy and collectively defining a selected function of an independent variable for discrete values thereof and each of said zones being graded in effect on radiant energy in accordance with another independent variable; an opaque mask having a plurality of zones corresponding to but of smaller area than said zones of said principal screen; an interpolation screen having a prescribed gradation in an effect on incident radiant energy related to interpolated values of said function between an adjacent pair of said zones; means for projecting radiant energy toward said screens and said mask so as to be influenced thereby in succession; means for effectively positioning said screens relative to one another in accordance with an independently variable quantity; means for effectively positioning said principal screen and said mask relative to one another in accordance with another independently variable quantity; and means responsive to radiant energy modified by said screens for deriving indications representing a value of said function corresponding to particular values of each of said variable quantity.

References Cited in the file of this patent

UNITED STATES PATENTS

| | | |
|---|---|---|
| 2,410,550 | Padva | Nov. 5, 1946 |
| 2,497,042 | Doll | Feb. 7, 1950 |
| 2,712,415 | Piety | July 5, 1955 |